United States Patent [19]

Gassler

[11] 4,388,786
[45] Jun. 21, 1983

[54] CONSTRUCTION MEANS FOR USE IN THE ASSEMBLY OF WALL AND/OR ROOF STRUCTURES

[76] Inventor: Kurt Gassler, Bühlweg 4, D-7050 Waiblingen-Neustadt, Fed. Rep. of Germany

[21] Appl. No.: 230,260

[22] Filed: Jan. 30, 1981

[51] Int. Cl.³ .................. A47G 29/00; F16B 9/00; E04B 2/78
[52] U.S. Cl. ........................................ 52/282; 52/238; 52/271; 52/669; 52/761
[58] Field of Search .................. 52/669, 761–763, 52/767, 775, 282, 238, 239, 241, 242, 271, 281

[56] References Cited
U.S. PATENT DOCUMENTS
3,486,287 12/1969 Guillon .......................... 52/282

FOREIGN PATENT DOCUMENTS
2504476 8/1976 Fed. Rep. of Germany ........ 52/282

Primary Examiner—Price C. Faw, Jr.
Assistant Examiner—Richard E. Chilcot, Jr.
Attorney, Agent, or Firm—Shlesinger, Arkwright, Garvey & Dinsmore

[57] ABSTRACT

Construction means for wall and/or roof structures, e.g. for exhibitions etc. has a stanchion profile section (10) with protruding webs (11) forming mortise-shaped pockets (12) and wall and/or roof supports (13, 14) each provided with a turnbuckle (15) consisting of three fixing elements (16, 17, 18) insertable into three adjacent pockets (12) of the stanchion (10), the fixing elements being urged towards each other by transverse tensioning means such as a screw (24) to grip the intervening webs (11) and simultaneously to urge the outer pair of fixing elements (16, 17) against the inner wall (71) of a support box (72) housing the turnbuckle (15).

19 Claims, 15 Drawing Figures

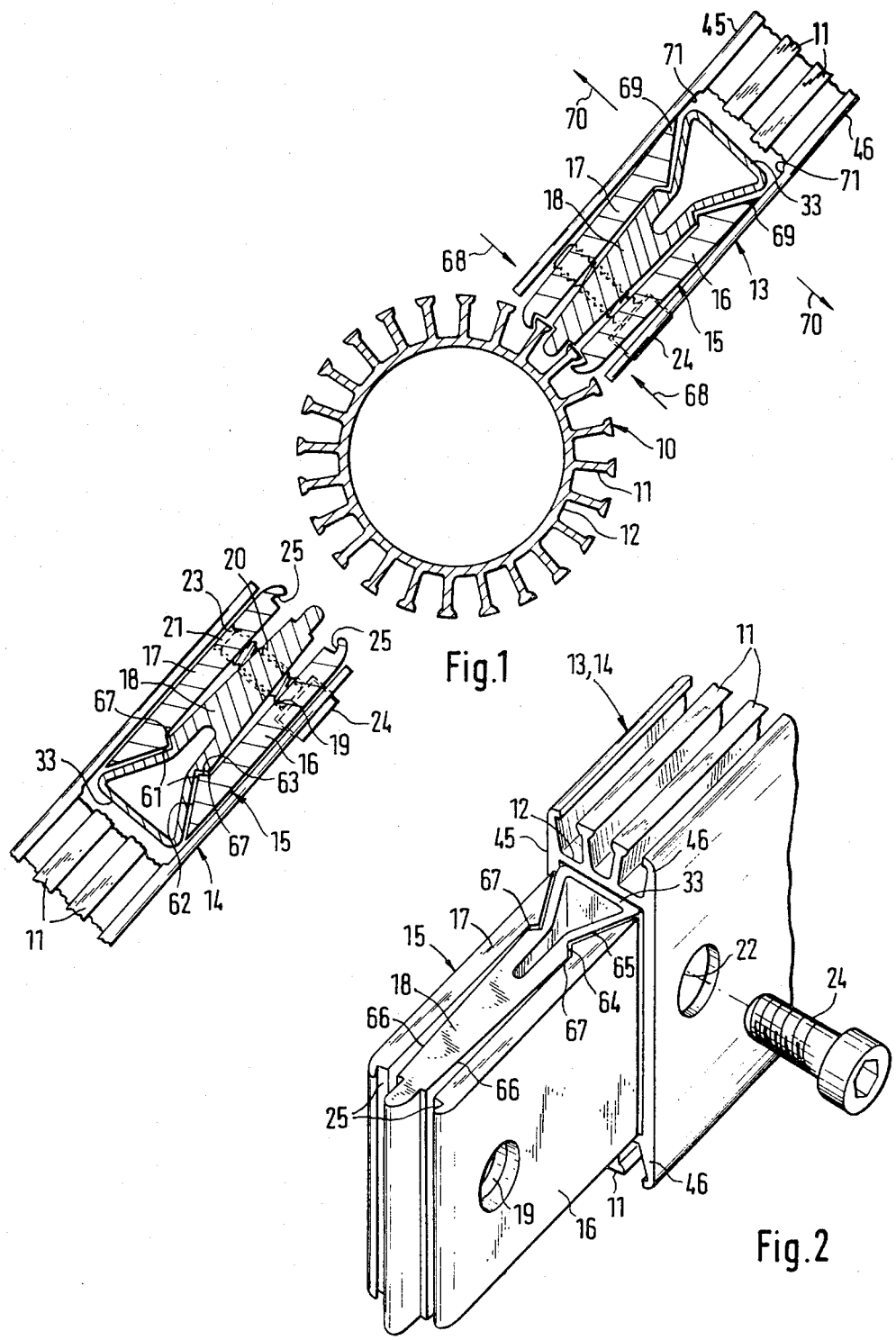

CONSTRUCTION MEANS FOR USE IN THE ASSEMBLY OF WALL AND/OR ROOF STRUCTURES

This invention relates to construction means for use in the assembly of wall and/or roof structures, more particularly for exhibition work, such as exhibition pavilions, open-air stands, single- or multi-storey indoor stands and the like, using a stanchion profile section having protrusions to which supports for the wall and/or roof members can be detachably secured, in which the protrusions take the form of axially or vertically extending webs of substantially T-shaped cross-section forming intermediate pockets of a corresponding mortise shape.

Stanchion profile sections of this type are normally used as the central or corner members of the structure concerned, from which the walls and roof radiate in certain specified directions. The completed structures, for example exhibition stands, usually take the form of regular rectangles, hexagons or octagons.

The object of the present invention is to provide construction means of the type described with which, on the one hand, the attachment of the supports to the stanchion profile section is simplified, while, on the other hand, the strength of the structure is improved and at the same time the diameter of the stanchion profile section can be reduced.

According to the present invention, each support has three fixing elements insertable into three adjacent mortise-shaped pockets between four adjacent webs of the stanchion profile section, and the three fixing elements are secured by tensioning means disposed transversely to them and adapted to urge them towards each other and into gripping engagement with the middle pair of the four webs in the stanchion profile section and simultaneously to urge the outer pair of fixing elements against the inner wall of a support box carrying the fixing elements.

The invention facilitates the radial attachment of supports to the stanchion profile section at any height thereon, without first having to insert holding straps radially into the mortise-shaped pockets between the webs and fixing them in position. Moreover, the supports are not merely located with respect to the stanchion profile section, but are secured to the stanchion profile section by the tensioning means of the invention, which confers both strength and rigidity on the structure. The loading of the webs on the stanchion profile section is very favorable, because the three fixing elements are inserted into three immediately adjacent mortise-shaped pockets, so that the webs are substantially loaded in pure tension without bending. The tensile loading of the webs in the stanchion profile section of the present invention being more favorable from the strength viewpoint than loading in bending, it is possible to adopt smaller wall thicknesses and hence a smaller diameter for the stanchion profile section. The aforementioned elimination of separate holding straps in and projecting from the mortise-shaped pockets between the webs has a further and very favorable influence in minimizing the diameter of the stanchion profile section.

Preferably, the three fixing elements form parts of a separate turnbuckle, and the turnbuckle is detachably secured inside the hollow support. This division into a support and a separate turnbuckle simplifies the production and assembly of the supports, which can be made for example as drawn light-metal profile sections.

In a further development of the basic concept of the invention, each of the three fixing elements is secured by means of a locking screw which passes transversely through the support, the support box and the fixing elements, while the locking screw can preferably be used simultaneously to fix the turnbuckle inside the support box.

Another preferred feature of the invention is that the supports have four protrusions each (four webs with three intermediate mortise-shaped pockets) on their top face and/or their bottom face, so that they can be used as required either as supports or as stanchion profile sections to which other supports can be attached.

Further details and advantageous modifications of the invention will emerge from the following description of the accompanying drawings showing various embodiments, and in which:

FIG. 1 is a horizontal section through construction means in accordance with the invention having a stanchion profile section, together with two supports, one of which is shown secured to the stanchion profile section while the other is still apart therefrom;

FIG. 2 is a perspective view of one end of one of the supports shown in FIG. 1, with the turnbuckle about to be fitted;

Figure 3:
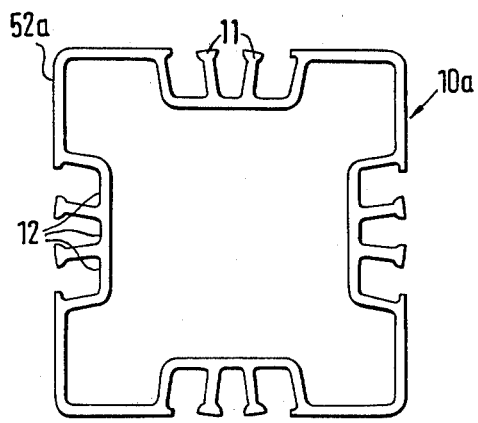
FIGS. 3 to 7 show further embodiments of stanchion profile section.

FIG. 1 shows a stanchion profile section 10 in the form of a drawn hollow cylindrical profile section having on its periphery twenty-four protrusions in the form of webs 11 of T-shaped cross-section forming intermediate mortise-shaped pockets 12.

Two supports 13 and 14 are shown at two diametrically opposite positions with respect to the stanchion profile section 10, to which supports can be attached wall or roof members (not shown) with suitable fixing means.

Each of the supports 13 and 14 is secured to the stanchion profile section 10 by means of a turnbuckle, generally indicated by part member 15. Each turnbuckle 15 has three substantially plate-shaped fixing elements 16, 17 and 18, which are insertable into three adjacent mortise-shaped pockets 12 between four adjacent webs 11 on the stanchion profile section 10. The fixing elements 16, 17 and 18 each have holes 19, 10 and 21 respectively in axial alignment. A hole 22 is also provided in at least one and preferably each sidewall in each of the supports 13 and 14. The hole 21 in the fixing element 17 has an internal thread 23 matching a locking screw 24, and the hole 19 in the outer fixing element 16 is counterbored to the diameter of the hole 22 which exceeds the diameter of the screw head.

As FIG. 1 shows, when each turnbuckle 15 is assembled in a support the aligned holes 19 to 22 are traversed by the locking screw 24, which screws at its far end into the thread 23 in the bore 21. As the locking screw 24 is tightened the distances between the three fixing elements 16, 17 and 18 are reduced. On the inside of each of the outer fixing elements 16 and 17 there is a rebate 25 which enables them to lock rigidly on to a pair of the webs 11 in the stanchion profile section 10 as the locking screw 24 is tightened.

FIG. 2 illustrates the assembly of the turnbuckle 15 in the support 13 or 14. The turnbuckle 15 is first inserted into the hollow support 13 or 14 from its open end until the bores 19 to 22 come into line. The locking screw 24 is then inserted into the bores 19, 20 and 22 and lightly screwed into the internal thread 23 in the bore 21. Next the support is fitted to the stanchion profile section 10 as indicated by the arrow on the left-hand side of FIG. 1. Finally, the locking screw 24 is tightened to secure the support to the stanchion profile section 10 as shown on the right-hand side of FIG. 1.

The locking screw 24 does not merely lock the fixing elements 16, 17 and 18 to the stanchion profile section 10, but also and simultaneously secures the turnbuckle 15 inside the support 13 or 14. The central fixing element 18 of the turnbuckle 15 has an integral rearward hollow section 33 of substantially triangular cross-section. The two outer fixing elements 16 and 17 on the other hand are separate plate-like components each with a knife-like catch 61 formed by two oblique faces 62 and 63 respectively. Recesses formed by oblique faces 64 and 65 in the central element 18, 33 of the turnbuckle 15 are engaged by the fixing-element catches 61. The central fixing element 18 is wedge-shaped, i.e. its sidefaces 66 converge forwardly at an acute angle. The oblique faces 65 and 66 on either side of the central fixing element 18 each form a shoulder 67 on which the two outer fixing elements 16 and 17 rock as in a knife-edge balance.

When the outer fixing elements 16, 17 are urged forwards the central fixing element 18 (as indicated by arrows 68 in FIG. 1), the rearward ends 69 of the two outer fixing elements 16 and 17 simultaneously tend to swivel outwards (as indicated by arrows 70), by reason of the knife-edge-like fulcrum at 67. Their freedom to swivel, however is restricted when they are assembled in the support 13 or 14 by the inner walls 71 of a support box 72 provided in the end of against which the ends 69 lock. Consequently, the turnbuckle 15 is rigidly secured to the support 13. Moreover, the head of the locking screws 24 ensures the axial location of the turnbuckle 15 in the assembled position shown in FIG. 1, by acting on the one hand against the hole 22 in the support 13 (or 14) and on the other hand against the counterbore of the hole 19 in the fixing element 16. The outer fixing elements 16, 17 (and/or the walls of the support box) may be resilient so that the rearward ends 69 of the outer fixing elements 16, 17 bear like springs on the corresponding inner walls of the support box 72.

Figure 4:
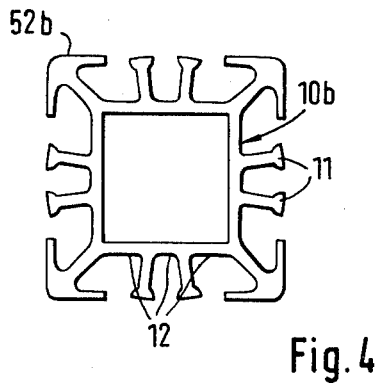
Figure 5:
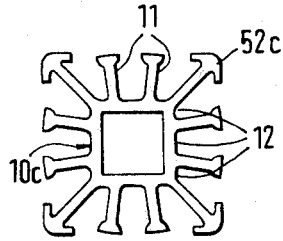

FIGS. 3, 4 and 5 illustrate alternative embodiments of stanchion profile section. These stanchion profile sections 10a, 10b and 10c all have a square cross-section, each peripheral face having three mortise-shaped pockets 12, two T-shaped webs 11 and a corner element 52a, 52b or 52c at each corner. Thus the stanchion profile sections 10a, 10b and 10c in FIGS. 3 to 5 can each accommodate a total of four supports of the type shown in FIGS. 1 and 2.

Figure 6:
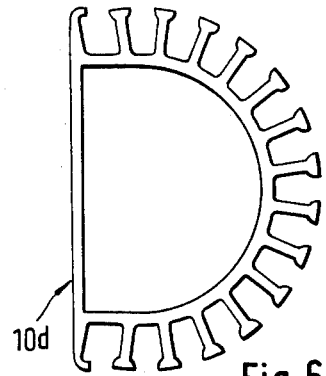
Figure 7:
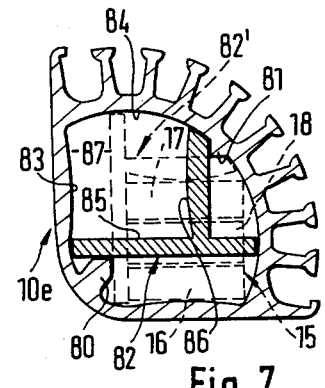

The embodiments shown in FIGS. 6 and 7 on the other hand relate to stanchion profile sections 10d or 10e having a semicircular or quadrant cross-section. These profile sections are relevant in cases when supports need only be, or only are, provided at angles of 180° to 90° to each other.

The stanchion profile section 10e shown in FIG. 7 is furthermore characterized by being suitable to seat a turnbuckle 15 (see FIGS. 1 and 2) in its inside space. The stanchion profile section 10e is designed as a hollow light-metal drawn section comprises two mutually opposite holding means 80, 81 which point toward each other and are integrated into the section. The holding means 80, 81 are used to support a closure means 82 set into the hollow section 10e and of approximately a T-shaped cross-section. On account of the inside walls 83, 84 of the section 10e on one hand and the walls 85, 86 of the closure means 82 on the other, a seating chamber 87 is formed, of which the cross-section is approximately square (or rectangular) and which is suited to house a turnbuckle (referenced by 15 in FIGS. 1 and 2 for instance). The section 10e in this instance no longer acts as a stanchion profile section, rather it can be used advantageously and alternatively also as a beam as a consequence of the above described steps.

The turnbuckle (for instance 15) rests by its two outer fixing elements 16, 17 on the wall surfaces 83, 86 which are slightly convex inwardly.

The quarter-circle design of the cavity within the profile section 10e and the symmetric arrangement of the holding means 80, 81 also permit a mirror-symmetrical mounting of the closure means 82 as indicated by dashed lines in FIG. 7 and referenced by 82'. A turnbuckle 15 consisting of the three fixing elements 16, 17 and 18 is shown, also in dashed lines, in the resulting seating spaced located in mirror-symmetrical fashion with respect to the seating chamber 87, in order to illustrate the above described possibilities.

The selective use of the stanchion profile sections as beams that is provided by the invention is in no way restricted to the quarter-circle stanchion profile section of FIG. 7. On the contrary, the stanchion profile sections of FIGS. 3, 4 and 6—if appropriate using suitable holding means and closure means—are wholly fit to seat turnbuckles, for instance 15, so that they too can be selectively used as beams. Moreover the stanchion profile sections shown (FIGS. 1, and 3 through 6) as well as the above described stanchion profile section of FIG. 7, are preferably made as hollow, light-metal drawn sections.

Figure 8:
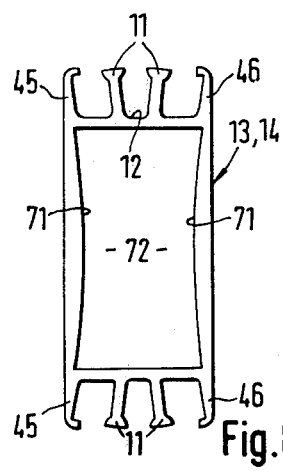
FIG. 8 is a cross-section of the support shown in FIG. 2.

FIGS. 8 to 15 show cross-sections of various possible supports. In this connection, FIG. 8 shows the cross-section of the supports 13 and 14 in FIGS. 1 and 2. This cross-section represents the so-called single-box section, which can take a single turnbuckle 15 at one end, or two turnbuckles 15, one at each end.

The support box 72 is rectangular—on conformity with the cross-section of the supports 13 and 14.

Figure 9:
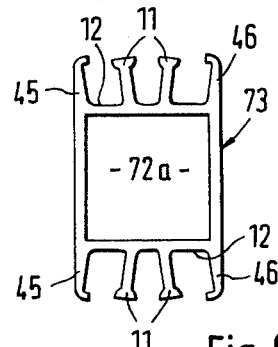
FIGS. 9 to 15 show alternative cross-sections for the supports.
Figure 10:
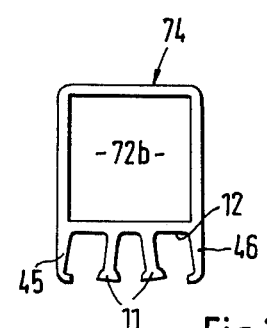
Figure 13:
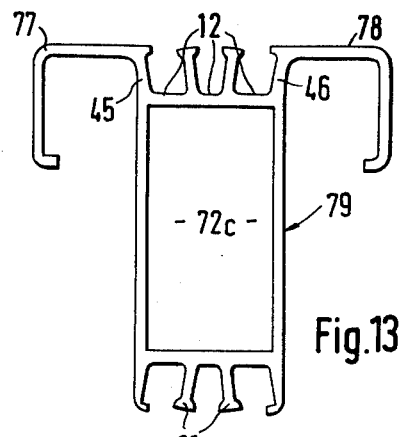
Figure 14:
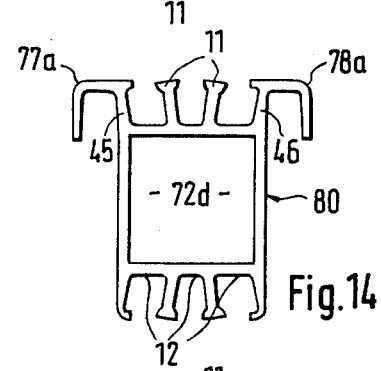

The support cross-sections numbered 73, 74, 79 and 80 in FIGS. 9, 10, 13 and 14 respectively are also of the so-called single-box section type. The boxes in these cases are numbered 72a to 72d and their cross-sections are either rectangular (FIG. 13) or square (FIGS. 9, 10 and 14).

Figure 11:
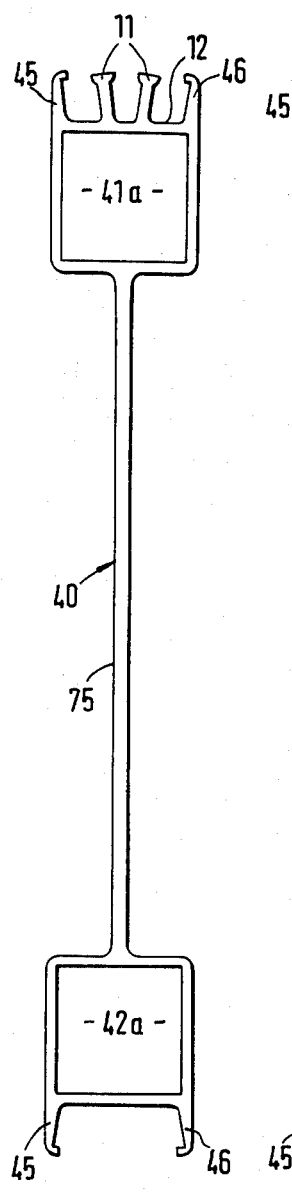
Figure 12:
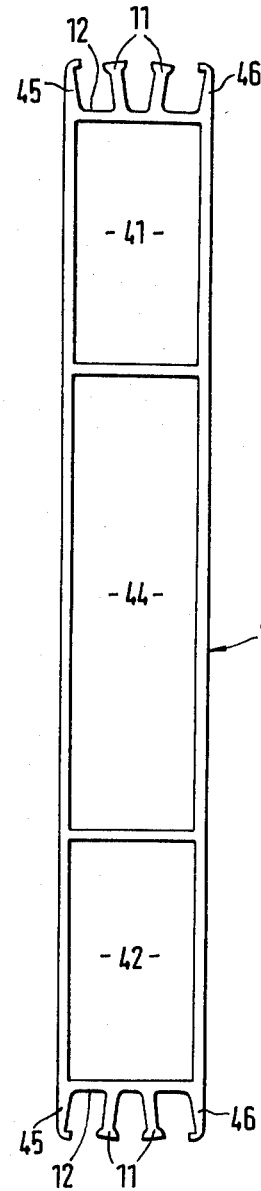
Figure 15:
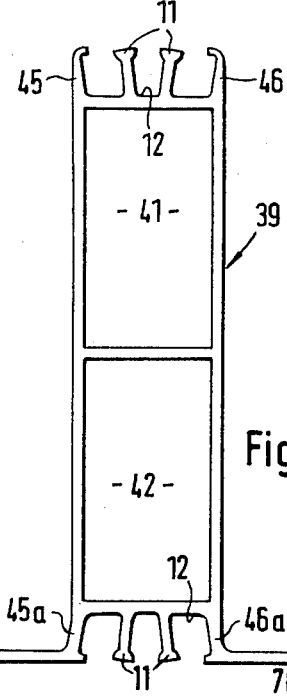

FIGS. 11 and 15 each show a support of the so-called two-box section type. Each of the cross-sections 39, 40 and in FIGS. 15 and 11 respectively incorporates an upper box 41 or 41a and a lower box 42 or 42a, each adapThe support 40 shown in FIG. 11 has a web element 75 extending between the two boxes 41a and 42a and joining them together.

The support 76 shown in FIG. 12 again relates to a so-called multi-box section, with the two boxes 41 and 42 joined together by a third box 44 which is not intended to be fitted with any turnbuckle 15.

Each of the support cross-sections illustrated and described has two webs 11 of substantially T-shaped cross-section are provided, on each of the top and bottom faces, and the side-walls of the supports are extended upwards and downwards so that a total of three mortise-shaped pockets 12 are formed between the sidewall extensions 45, 46 or 45a, 46a and the webs 11 on either face.

In the embodiment shown in FIG. 10, only one face is provided with the T-shaped webs 11, the sidewall extensions 45, 46 and the mortise-shaped pockets 12.

The support profile 40 of FIG. 11 retains the sidewall extensions 45 and 46 on the underside of the box 42a, but not the intermediate T-shaped webs.

The embodiments shown in FIGS. 13, 14 and 15 incorporate rectangularly bent angle-pieces 77 and 78 (FIGS. 13 and 15) or 77a and 78a (FIG. 14) on the sidewalls, acting as stiffeners and/or special forming attachments.

The parts numbered 11, 12 as described above, on the supports shown in FIGS. 8 to 15, can be used to secure suitable wall or roof members. However, when the supports are designed as described it is also and more particularly possible to use the supports themselves as vertical stanchion profile sections (in the manner of part number 10 in FIG. 1) and to secure additional supports laterally thereto. Thus the supports illustrated and described can be used in a wide variety of ways.

The inside wall of the beams or stanchion profile sections serving as seating chambers for the turnbuckles 15 may be made planar—the way in fact they are shown in most figures of the drawings—whereby there result corresponding square or rectangular cross-sections of the seating chambers (denoted in FIGS. 9 and 10 by 72a and 72b resp. for instance). In a preferred embodiment of the invention, however, those inside walls of the beam seating chambers which frictionally brace the sideways fixing elements 16, 17 of the turnbuckle, are inwardly convex and reinforced. Such a design of the inside walls applicable in this respect is shown in the embodiment of FIG. 7 (note the inside walls 83, 86). Because of the inwardly convex design of the inside walls of the seating chambers, there results the advantage that when clamping the turnbuckle 15 against the inside walls, the desired line-contact between the lateral fixing elements 16, 17 of the turnbuckle and the inside walls (for instance 71 or 83, 86) of the particular seating chamber (for instance 72 and 87 resp.) will be achieved, note being necessarily taken in this regard that the inside walls will slightly yield outwardly in elastic manner when the turnbuckle 24 is strongly tightened (FIGS. 1 and 2).

The convexity of the side walls 71 is shown in exaggerated manner to better represent it in FIG. 8. In practice the convexity may be so slight and still sufficient that they would escape detection at first sight.

The convexity of the side walls shown in FIGS. 7 and 8 therefore may be provided also in the beams of stanchion profile sections of FIGS. 3, 4, 6 and 9–15 suitable for seating turnbuckles 15. As regards the profile sections with seating chambers of rectangular cross-section (FIGS. 1, 2, 8, 12, 13 and 15), the particular two opposite longer inside walls then must be convex inwardly and reinforced. On the other hand, as regards the profile sections of square cross-section for the seating chambers (FIGS. 4, 9, 10, 11 and 14), alternating arrangements of the turnbuckles are possible in two positions mutually offset by 90°. As regards these profile sections with seating chambers of square cross-section, it is recommended accordingly to make all four inside walls convex inwardly and reinforced.

I claim:
1. Construction means for use in the assembly of walls and/or roof structures, comprising:
    a. a body having a receptacle and including inside surfaces and an aperture therethrough;
    b. stanchion gripping means, comprising:
        i. a central wedge-shaped positioning element having a positioning member on one end thereof;
        ii. a pair of gripping elements having opposed gripping ends on one end thereof pivotably mounted on either side of said central element;
        iii. said central element and said pair of gripping elements each having a cooperating aperture therethrough; and,
        iv. said gripping ends associated with said positioning member;
    c. said stanchion gripping means positioned in said receptacle whereby said cooperating apertures are co-axial with said body aperture;
    d. said gripping means engageable with a pair of co-operating shaped stanchions whereby said positioning member is positioned between said pair of stanchions and each of said gripping ends is associated with a stanchion outside surface adjacent each of said gripping ends; and,
    e. tensioning means insertable in each of said apertures to pivot said gripping elements and cause said gripping ends to securely grasp said stanchions and to pivot each of said gripping elements other end against said receptacle inside surfaces and to thereby secure said stanchion gripping means therein.

2. Construction means as defined in claim 1, wherein:
    a. said tensioning means includes a locking screw passing transversely through said body and said stanchion gripping means.

3. Construction means as defined in claim 1, further comprising:
    a. a rebate associated with each of said gripping ends to securely grasp said shaped stanchion.

4. Construction means as defined in claim 1, wherein:
    a. said body includes an exterior face; and,
    b. said exterior face of said body includes at least two stanchions extending substantially the length of said body for positioning said stanchion gripping means thereon.

5. Construction means as defined in claim 1, wherein:
    a. said stanchion gripping means is detachably secured within said receptacle.

6. Construction means as defined in claim 5, wherein:
    a. a locking screw detachably secures said stanchion gripping means in said receptacle.

7. Construction means as defined in claim 6, wherein:
    a. said positioning element includes a recess and a wedge-shaped shoulder adjacent each of said gripping elements and associated with the end of said positioning element opposite said positioning member end; and,
    b. each of said gripping elements includes catch means cooperating with said adjacent recess and shoulder for enhancing the pivoting of said gripping elements so that when said locking screw is tightened said ends of said gripping elements opposite said gripping ends detachably contact against said receptacle inside surfaces.

8. Construction means as defined in claim 7, wherein:

a. said gripping elements are resilient so that said surface contacting ends elastically bear against said receptacle inside surfaces.

9. Construction means as defined in claim 6, wherein:
a. said body includes a hollow member about which a number of pairs of stanchions are arranged; and,
b. said hollow member includes a receptacle for receiving said stanchion gripping means.

10. Construction means as defined in claim 9, wherein:
a. said hollow member is cylindrically shaped; and,
b. said pairs of said stanchions are equi-angularly positioned about said hollow member circumference.

11. Construction means as defined in claim 9, wherein:
a. said hollow member in cross-section is partially circular.

12. Construction means as defined in claim 9, wherein:
a. said hollow member is adapted for positioning a stanchion gripping means therein.

13. Construction means as defined in claim 12, wherein:
a. said hollow member includes a number of internal cooperating support members; and,
b. said cooperating members define a receptacle having a cross-section substantially equal to said stanchion gripping means cross-section for receipt of a stanchion gripping means.

14. Construction means as defined in claim 13, wherein:
a. said hollow member includes at least two opposed holding means; and,
b. said cooperating support members are positioned in said hollow member for preventing displacement of said stanchion gripping means through said hollow member.

15. Construction means defined in claim 14, wherein:
a. said hollow member includes arcuate inner surfaces for locking said stanchion gripping means.

16. Construction means as defined in claim 9, wherein:
a. said hollow member in cross-section is substantially rectangularly shaped and includes four faces;
b. each face of said rectangle includes two stanchions extending therefrom; and,
c. each corner of said rectangle includes an angled stanchion extending transversely therefrom.

17. Construction means as defined in claim 16, wherein:
a. said rectangle includes a sized receptacle for receiving one of said stanchion gripping means therein.

18. Construction means as defined in claim 16, wherein:
a. said rectangle is divided into at least two receptacles for positioning one of said stanchion gripping means in each of said receptacles.

19. Construction means as defined in claim 18, wherein:
a. each of said rectangles includes two opposed stiffening members extending therefrom.

* * * * *